United States Patent [19]
Yokoyama

[11] Patent Number: 4,891,342
[45] Date of Patent: Jan. 2, 1990

[54] PROCESS FOR PREPARING A SILICON NITRIDE SINTERED BODY

[75] Inventor: Kiyoshi Yokoyama, Hayato, Japan

[73] Assignee: Kyocera Corporation, Kyoto, Japan

[21] Appl. No.: 932,196

[22] Filed: Nov. 18, 1986

[30] Foreign Application Priority Data

| Nov. 20, 1985 | [JP] | Japan | 60-262133 |
| Nov. 29, 1985 | [JP] | Japan | 60-269807 |
| Nov. 29, 1985 | [JP] | Japan | 60-269807 |
| Mar. 17, 1986 | [JP] | Japan | 61-59892 |
| Mar. 25, 1986 | [JP] | Japan | 61-67682 |
| Jun. 12, 1986 | [JP] | Japan | 61-137920 |

[51] Int. Cl.$^4$ .............................................. C04B 35/58
[52] U.S. Cl. .......................................... 501/97; 501/98; 264/65; 264/66
[58] Field of Search .............. 501/97, 98; 264/65, 264/66

[56] References Cited

U.S. PATENT DOCUMENTS

| 4,304,576 | 12/1981 | Hattori et al. | 51/309 |
| 4,535,063 | 8/1985 | Matsuhiro et al. | 501/97 |
| 4,560,669 | 12/1985 | Matsuhiro et al. | 501/97 |
| 4,628,039 | 12/1980 | Mizutani et al. | 501/97 |

FOREIGN PATENT DOCUMENTS

| 58-213677 | 12/1983 | Japan | 501/97 |
| 59-152254 | 8/1984 | Japan | 501/97 |
| 59-190270 | 10/1984 | Japan | 501/97 |
| 59-190274 | 10/1984 | Japan | 501/97 |

Primary Examiner—William R. Dixon, Jr.
Assistant Examiner—Karl Group
Attorney, Agent, or Firm—Spensley Horn Jubas & Lubitz

[57] ABSTRACT

Disclosed is a silicon nitride sintered body comprising 1 to 20% by weight as the oxide of a zirconium component and 1 to 10% by weight as the oxide of a yttrium component, with the balance being silicon nitride, in which the amount of excessive oxygen is 0 to 3% by weight based on the sintered body. This sintered body is obtained by sintering a starting material mixture comprising the above-mentioned three components in a nitrogen atomosphere controlled by $SiO_2$ added to the stating material mixture or in a nitrogen atmosphere controlled by the co-presence of a mixture of metallic silicon and silica.

15 Claims, 3 Drawing Sheets

PROCESS FOR PREPARING A SILICON NITRIDE SINTERED BODY

BACKGROUND OF THE INVENTION (1) Field of the Invention

The present invention relates to a silicon nitride sintered body and a process for the preparation thereof. More particularly, the present invention relates to a silicon nitride sintered body excellent in the strength at high temperatures and the creep resistance, and a process for the preparation thereof.

(2) Description of the Prior Art

A sintered body composed of silicon nitride has a covalent bond as the main atom-linking bond and is excellent in strength, hardness and thermochemical stability, and therefore, this sintered body is used as engineering ceramics for a heat engine, for example, a gas turbine engine.

It is expected that with recent increase of the efficiency in a heat engine, the operation temperature of the heat engine will be elevated to a level higher than 1400° C., and development of a matrial that can be used under this condition is desired.

As the sintering method for preparing silicon nitride, there have been adopted a hot press method and a pressureless sintering method, and a gas pressure sintering method is recently examined.

In these methods, it is intended to leave the added ingredients as a glass phase or crystal phase in the grain boundary or in the state solid-dissolved in the crystal phase of silicon nitride after sintering without decomposition.

If the additive ingredients are left in the sintered body, this results in suppression of excellent characteristics of silicon nitride owing to the covalent bond, such as a high strength at high temperatures and a high creep resistance. More specifically, in the case where an oxide type sintering aid is added, the sintering aid reacts with silicon nitride and a metal compound composed mainly of an oxide or nitride of silicon is formed in the grain boundary. This oxide or nitride promotes sintering and densification at the sintering step to improve the sintering property, but since this oxide or nitride has a strong ionic bonding property, the oxide or nitride tends to degrade the characteristics of the sintered body at high temperatures.

As means for controlling this tendency, there is proposed a method in which $ZrO_2$ is used as the sintering aid to precipitate $ZrO_2$ in the grain boundary of the sintered body and by utilizing the high melting point of $ZrO_2$, the high-temperature characteristics of the sintered body are improved. However, if this sintered body is prepared according to any of the hot press method, the pressureless sintering method and the gas pressure sintering method, $ZrO_2$ reacts with $Si_3N_4$ to form ZrN in the sintered body. While this ZrN is converted to $ZrO_2$ in a high-temperature oxidizing atmosphere, the volume is expanded by about 30%. Accordingly, the sintered body is readily cracked at the oxidation, and the ZrN-containing sintered body per se is very readily oxidized in a high-temperature oxidizing atmosphere and this sintered body is not satisfactory as a material to be used at high temperatures.

SUMMARY OF THE INVENTION

We found that in sintering silicon nitride containing zirconia, if a nitrogen atmosphere controlled by $SiO_2$ added to the system to be sintered or a nitrogen atmosphere controlled by an $Si/SiO_2$ mixture present in the atmosphere is formed, formation of ZrN in the sintered body is controlled and precipitation of $ZrO_2$ in the grain boundary is promoted and if the amount of oxygen in the sintered body is made close to the stoichiometric amount as calculated as the oxide, an excellent high-temperature strength can be obtained. We have now completed the present invention based on this finding.

It is a primary object of the present invention to provide a silicon nitride sintered body having a high strength at high temperatures and being excellent in the creep resistance and oxidation resistance and a process for the preparation thereof.

In accordance with one fundamental aspect of the present invention, there is provided a sintered body comprising 1 to 20% by weight as the oxide of a zirconium component and 1 to 10% by weight as the oxide of a yttrium component, with the balance being silicon nitride, each percent being based on the three components, wherein the amount of excessive oxygen in the sintered body is 0 to 3% by weight based on the sintered body.

In accordance with another aspect of the present invention, there is provided a process for the preparation of a silicon nitride sintered body, which comprises the step of molding a starting material mixture comprising 1 to 20% by weight of zirconia and 1 to 10% by weight, of yttria with the balance being silicon nitride, each percent being based on the three components, and further containing silica in an amount of 1 to 10 parts by weight per 100 parts by weight of the sum of said three components and the step of sintering the molded body in a nitrogen atmosphere, said two steps being conducted sequentially in this order or simultaneously.

In accordance with still another aspect of the present invention, there is provided a process for the preparation of a silicon nitride sintered body, which comprises the step of molding a starting material mixture comprising 1 to 20% by weight of zirconia and 1 to 10% by weight of yttria, with the balance being silicon nitride, each percent being based on the three components, and the step of sintering the molded body in a nitrogen atmosphere controlled by a co-present mixture of metallic silicon and silica, said steps being conducted sequentially in this order or simultaneously.

In accordance with a further aspect of the present invention, there is provided a process for the preparation of a silicon nitride sintered body, which comprises the step of molding a starting material mixture comprising 1 to 10% by weight of zirconium carbide and 1 to 10% by weight of yttria, with the balance being silicon nitride, each percent being based on the three components, and the step of sintering the molded body in a nitrogen atmosphere, said steps being conducted sequentially in this order or simultaneously.

DETAILED DESCRIPTION OF THE PREFERRED EMBODIMENTS

Figure 1:
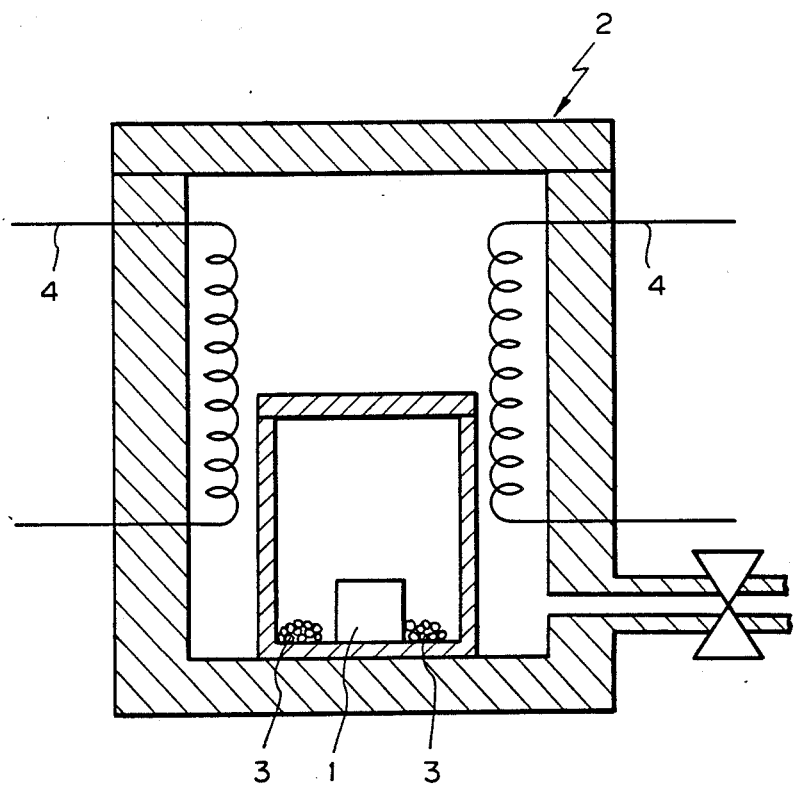
FIG. 1 is a diagram illustrating an example of the sintering step of the preparation process of the present invention.

When a system comprising silicon nitride and $ZrO_2$ as the sintering aid is sintered according to a known sintering method such as the hot press method, the pressureless sintering method or the gas pressure sintering method, a part of $ZrO_2$ makes a reversible reaction as represented by the following formula (1) with silicon nitride:

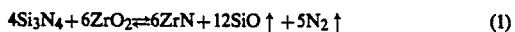
$$4Si_3N_4 + 6ZrO_2 \rightleftarrows 6ZrN + 12SiO\uparrow + 5N_2\uparrow \quad (1)$$

By this reaction, ZrN is formed in the sintered body and SiO gas and $N_2$ gas are generated. If formed ZrN is exposed as the sintered body to a high-temperature oxidizing atmosphere, it is oxidized to $ZrO_2$ and at this point the volume is expanded. By this volume expansion, the sintered body is readily cracked, resulting in reduction of the strength at high temperatures. Accordingly, the presence of ZrN in the sintered body should be avoided.

The sintered body of the present invention comprises 1 to 20% by weight, preferably 5 to 10% by weight, as the oxide of a Zr component and 1 to 10% by weight, preferably 1 to 5% by weight, as the oxide of a Y component, with the balance being substantially silicon nitride, each percent being based on the three components, and it is important that the amount of excessive oxygen in the sintered body should be 0 to 3% by weight, especially 0 to 1.5% by weight, based on the sintered body. The amount of excessive oxygen referred to herein is the amount of oxygen calculated by subtracting the amount of oxygen stoichiometrically bonded as the oxide to Zr and Y added as the sintering aid from the total amount of oxygen contained in the sintered body. It is considered that this excessive oxygen is brought about by $SiO_2$.

At the experiments made by us, it was found that in the $ZrO_2$-$Y_2O_3$-$Si_3N_4$ sintered body obtained by the conventional sintering method, the calculated value of the amount of excessive oxygen tends to be a negative value. This means formation of zirconium nitride (ZrN). Accordingly, in the present invention, it is important that the amount of excessive oxygen should be at least 0% by weight. If the amount of excessive oxygen exceeds 3% by weight, segregation of excessive oxygen in the crystal grain boundary is caused, and therefore, $SiO_2$ in the grain boundary phase is increased and the content of the glass component is increased, resulting in drastic degradation of the high-temperature strength.

Figure 2:
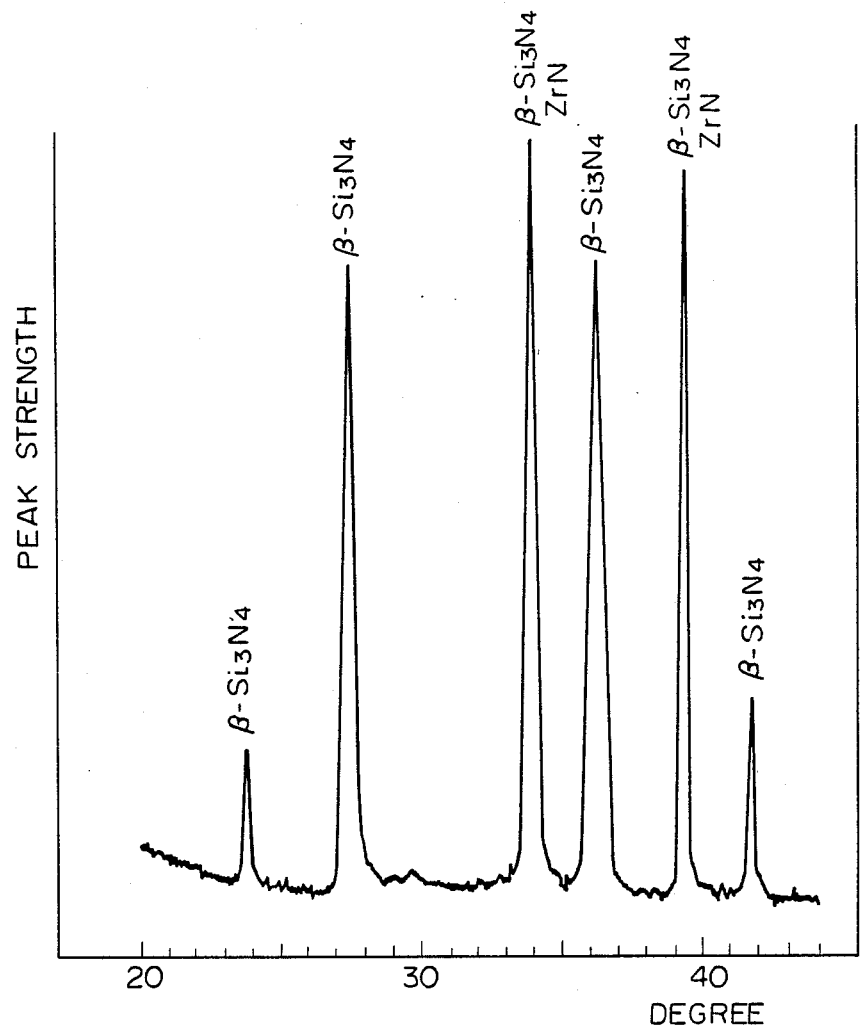
FIG. 2 is a diagram illustrating the X-ray diffraction pattern of the conventional $ZrO_2$-$Y_2O_3$-$Si_3N_4$ sintered body.
Figure 3:
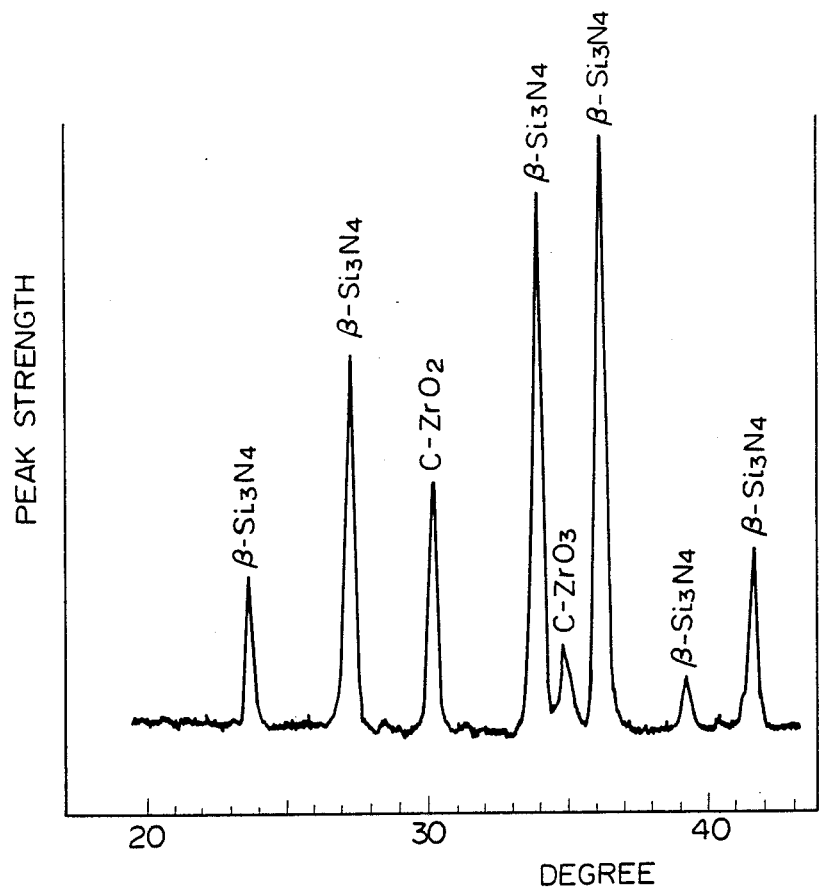
FIG. 3 is a diagram illustrating the X-ray diffraction pattern of the $ZrO_2$-$Y_2O_3$-$Si_3N_4$ sintered body of the present invention.

FIG. 2 is a diagram showing the X-ray diffraction pattern of the $ZrO_2$-$Y_2O_3$-$Si_3N_4$ sintered body according to the conventional method (the amount of excessive oxygen is −0.1% by weight), and FIG. 3 is a diagram illustrating the X-ray diffraction pattern of the $ZrO_2$-$Y_2O_3$-$Si_3N_4$ of the present invention (the amount of excessive oxygen is 1.4% by weight). If these X-ray diffraction patterns are compared, it is seen that in the X-ray diffraction pattern of the sintered body of the present invention shown in FIG. 3, $ZrO_2$ is apparently present as c-$ZrO_2$, while in the X-ray diffraction pattern of the conventional sintered body, the peak of c-$ZrO_2$ is not present but the peak of ZrN is overlapped on the peak of $\beta$-$Si_3N_4$. Since the intensity of this peak of ZrN is high, it is understood that Zr is present substantially as ZrN.

According to the present invention, by using a controlled mixed atmosphere containing SiO and nitrogen as the sintering atmosphere, the reaction of the formula (1) is prevented from advancing to the right side, whereby formation of ZrN is controlled.

This controlled nitrogen atmosphere can be produced by (i) incorporating a certain amount of silica into the starting mixture or (ii) making a mixture of metallic silicon and silica present in the sintering atmosphere.

In the present invention, a composition comprising 1 to 20% by weight, especially 5 to 10% by weight, of $ZrO_2$ and 1 to 10% by weight, especially 1 to 5% by weight, of $Y_2O_3$, with the balance being substantially silicon nitride, each percent being based on the three components, is prepared.

If the amount of $ZrO_2$ in the powdery composition is smaller than 1% by weight, the high-temperature strength of the sintered body is drastically degraded, and if the amount of $ZrO_2$ is larger than 20% by weight, a sintered body poor in the toughness at break is readily obtained. If the amount of $Y_2O_3$ is smaller than 1% by weight, the sintering property is degraded and if the amount of $Y_2O_3$ is larger than 10% by weight, the oxidation resistance of the sintered body is degraded. It is preferred that the sum of yttria and zirconium oxide be 5–10% by weight.

Silicon nitride having an $\alpha$-$Si_3N_4$ content of at least 85% by weight is preferably used as silicon nitride in the present invention.

Addition of $ZrO_3$ and $Y_2O_3$ may be accomplished by adding powders of $ZrO_2$ and $Y_2O_3$ independently or by adding a powder of stabilized or partially stabilized zirconia formed by solid-dissolving $Y_2O_3$ into $ZrO_2$.

In accordance with one preferred embodiment of the present invention, a coprecipitated starting material comprising $ZrO_2$ and $Y_2O_3$ at a $Y_2O_3/(ZrO_2+Y_2O_3)$ molar ratio of from 0.02 to 0.30, especially from 0.10 to 0.20, is used as the starting material powder. In this composition, $Y_2O_3$ is uniformly dispersed in $ZrO_2$. By this uniform dispersion of $Y_2O_3$, $Y_2O_3$ is solid-dissolved in $ZrO_2$ and $ZrO_2$ can be made present in the sintered body as substantially completely stabilized $ZrO_2$.

According to this preferred embodiment of the present invention, a powdery mixture comprising up to 20% by weight, preferably up to 12% by weight, of the coprecipitated starting material having the above-mentioned composition, with the balance being silicon nitride, is prepared. If the $Y_2O_3/(ZrO_2+Y_2O_3)$ molar ratio is lower than 0.02, sintering is difficult and a sintered body having a high strength cannot be obtained. If this molar ratio exceeds 0.30, the high-temperature strength and oxidation resistance are degraded. If the content of the coprecipitated starting material exceeds 20% by weight, the high-temperature strength and oxidation resistance are degraded.

The coprecipitated starting material is obtained by mixing a soluble zirconium salt such as zirconium chloride or zirconium chloro-oxide with a soluble yttrium salt such as yttrium chloride or yttrium nitrate so that the above-mentioned oxide molar ratio is attained, adding an alkali such as an alkali hydroxide, washing, drying and, if necessary, calcining the obtained coprecipitate.

According to the above-mentioned means (i) of the present invention, 1 to 10 parts by weight, especially 1 to 5 parts by weight, of $SiO_2$ is added to 100 parts by weight of the above-mentioned composition, and a homogeneous mixture is prepared.

It is important that the amount added of $SiO_2$ should be set at 1 to 10 parts by weight. If the amount of $SiO_2$ is smaller than 1 part, the effect of controlling formation of ZrN cannot be attained, and if the amount of $SiO_2$ exceeds 10 parts by weight, volatilization of $SiO_2$ becomes troublesome, and it is difficult to control the amount of excessive oxygen within the range specified in the present invention and degradation of the high-temperature strength is caused.

The powdery mixture is molded into a desired shape by a known molding method such as press molding, cast molding, extrusion molding or injection molding, and the molded body is transferred to the sintering step.

Sintering is carried out at a sintering temperature of 1700° to 2000° C. in a nitrogen atmosphere, and at this sintering step, conversion of $ZrO_2$ to ZrN is efficiently controlled by $SiO_2$ added at the molding step. The reason is considered to be that since $SiO_2$ has a low boiling point, $SiO_2$ is gasified at the sintering temperature to form SiO and and a mixed atmosphere comprising $N_2$ and SiO at a high concentration is formed on the surface of the sintered body and in the vicinity thereof, whereby advance of the reaction to the right side of the reaction formula (1) is prevented.

It is preferred that the nitrogen gas pressure be higher than the decomposition equilibrium pressure of silicon nitride at the sintering temperature adopted and within the range of 1 to 2000 atmosphere (gauge).

This sintering can be accomplished by a known sintering method such as the pressureless sintering method, the gas pressure sintering method, the hot hydrostatic pressure sintering method or the hot press method, but the gas pressure sintering method and the pressureless sintering method are especially preferred.

Finally, initially added $SiO_2$ is substantially volatilized or a very minute amount of $SiO_2$ is left in the sintered body. The amount of excessive oxygen depends on this residual $SiO_2$. Accordingly, the amount of excessive oxygen can be appropriately adjusted according to the amount added of $SiO_2$, the sintering temperature and the sintering time.

Referring to FIG. 1 illustrating the above-mentioned means (ii) of the present invention, when the obtained molded body 1 is placed in a sintering furnace 2, a mixture 3 composed of metallic Si and $SiO_2$ is simultaneously placed in the sintering furnace 2. Then, the temperature in the sintering furnace 2 is elevated by a heater 4 to maintain a sintering temperature of 1700° to 2000° C. in the atmosphere of $N_2$. The $N_2$ gas pressure is set at a level higher than the equilibrium decomposition pressure of silicon nitride at the sintering temperature to control decomposition of silicon nitride. The reaction represented by the following formula (2) is advanced at a high temperature in the mixture 3 placed in the sintering furnace 2:

$$Si + SiO_2 \rightleftarrows 2SiO \uparrow \qquad (2)$$

By this reaction (2), SiO gas is generated, and the atmosphere is controlled to the equilibrium SiO pressure at the sintering temperature of the reaction.

By carrying out sintering in the atmosphere thus controlled, the advance of the above-mentioned reaction (1) is controlled and formation of ZrN can be prevented.

It is presumed that the reason is that the $N_2$ gas pressure and the equilibrium SiO gas pressure of the reaction (2) at the sintering temperature are higher than the equilibrium $N_2$ gas pressure and the SiO gas pressure at the reaction (1).

In the minute of metallic Si and $SiO_2$ used at the sintering step, the $Si/SiO_2$ molar ratio may be from 0.1 to 10, but as is apparent from the reaction formula (2), the reaction is advanced between equimolar amounts of metallic Si and SiO, and therefore, it is preferred that in the mixture of metallic Si and SiO used at the sintering step, the $Si/SiO_2$ molar ratio be substantially 1. If the amount of $SiO_2$ is large, a large amount of oxygen is generated during the reaction (2) and no good results can be obtained.

It is preferred that the mixture of metallic Si and SiO be made present in an amount of 10 to 200 parts by weight, especially 30 to 100 parts by weight, per 100 parts by weight of the molded body of the powdery mixture.

In this embodiment, the molding and sintering steps can be carried out in the same manner as described above with respect to the means (i).

In accordance with still another embodiment of the present invention, in order to form a glass phase of $ZrO_2$ in the grain boundary phase of the sintered body, $ZrO_2$ is not used as the starting material but zirconium carbide (hereinafter referred to as "ZrC") is used. At the sintering step, ZrC reacts with $SiO_2$ formed on the surfaces of the silicon nitride particles to form a zirconium silicate glass having a relatively high melting point. In this case, formation of ZrN is not observed, and it is considered that ZrC is dissolved in the silicate glass. If the amount of silica, that is, the amount of the silicate glass, is small, ZrC is not sufficiently dissolved in the silicate glass but reacts with silicon nitride to form ZrN. Accordingly, by incorporating a certain amount of silica into the starting material powder, formation of ZrN can be assuredly controlled.

In the present invention, since the function of ZrC alone as the sintering aid to silicon nitride is insufficient, in order to densify the sintered body, it is necessary that yttria should be used in combination with ZrC. Therefore, the starting material powder should comprise 1 to 10% by weight, especially 3 to 9% by weight, of yttria and 1 to 10% by weight, especially 1 to 7% by weight, of zirconium carbide, with the balance being silicon nitride. It is preferred that the sum of yttria and zirconium carbide be 5 to 10% by weight. In order to control formation of ZrN assuredly, silica is added in an amount of up to 10 parts by weight per 100 parts by weight of the starting material powder having the above-mentioned composition. In the above-mentioned composition, if the amount of $Y_2O_3$ is smaller than 1% by weight, the sintering property is poor, and if the amount of $Y_2O_3$ is larger than 10% by weight, the oxidation resistance is readily degraded. If the amount of ZrC is smaller than 1% by weight, the high-temperature strength is reduced, and if the amount of ZrC is larger than 10% by weight, the sintering property is hindered.

When the above-mentioned means (ii) is adopted at the sintering step in this embodiment, good results can be obtained.

In the sintered body finally obtained in the present invention, ZrN is not formed during the sintering process and $ZrO_2$ is precipitated as a crystal phase in the grain boundary phase of the sintered body. This crystal phase is composed of partially stabilized zirconia (PSZ) or stabilized zirconia in which $Y_2O_3$ is solid-dissolved, and this crystal phase has a very high melting point. Accordingly, even if the sintered body is used in an oxidizing atmosphere at a high temperature, degradation of the strength due to softening of the grain boundary phase is not caused. Furthermore, since a dense film of $SiO_2$ is formed on the oxidized surface, the increase of the amount of oxidation is very small.

As is apparent from the foregoing description, the silicon nitride sintered body of the present invention is substantially free of ZrN because of the characteristics of the preparation process and the amount of excessive oxygen is 0 to 3% by weight. Accordingly, even in a high-temperature oxidizing atmosphere, expansion of the volume is not caused, and the sintered body of the present invention is excellent in the high-temperature strength and the creep resistance. Therefore, the silicon nitride sintered body of the present invention can be advantageously used for a heat engine such as a turbine engine.

The present invention will now be described in detail with reference to the following examples that by no means limit the scope of the invention.

EXAMPLE 1

$Si_3N_4$ powder comprising 98% of $\alpha$-$Si_3N_4$ and having an oxygen content of 1.5 to 2% by weight was used as the starting $Si_3N_4$ powder.

A powdery mixture having a composition shown in Table 1 was molded and then sintered under conditions shown in Table 1. The strength of the obtained sintered body was measured at room temperature, 200° C. and 1400° C. according to the 4-point bending method of JIS R-1601. The test piece was allowed to stand still in open air at 1400° C. for 24 hours, and the increase of the amount by oxidation at 1400° C. was evaluated based on the amount increased per unit area. The amount of excessive oxygen was determined according to the following method.

At first, the total oxygen amount was measured by an apparatus for the simultaneously analysis of oxygen and nitrogen (supplied by LECO Co.), and the amounts of Zr and Y were measured according to the ICP analysis and the amount of oxygen as the oxide was calculated from these amounts. The amount of excessive oxygen was obtained by subtracting this amount of oxygen from the total oxygen amount.

The obtained results are shown in Table 1.

TABLE 1

| Sample No. (1) | Composition (% by weight) | | | Amount of $SiO_2$ (parts by weight) (2) | Sintering Temperature (°C.) | Sintering Method (3) | Pressure (atmospheres) |
|---|---|---|---|---|---|---|---|
| | $Si_3N_4$ | $ZrO_2$ | $Y_2O_3$ | | | | |
| 1 | 90 | 7.67 | 2.33 | 2.0 | 1900 | GPS | 100 |
| 2 | 90 | 7.0 | 3.0 | 5.0 | 1850 | GPS | 100 |
| 3 | 85 | 10.5 | 4.5 | 6.0 | 1750 | PL | 1 |
| 4* | 90 | 7.67 | 2.33 | 0.5 | 1900 | GPS | 100 |
| 5* | 90 | 7.67 | 2.33 | 12.0 | 1850 | GPS | 100 |
| 6* | 80 | 15.0 | 5.0 | — | 1850 | GPS | 10 |
| 7 | 90 | 7.0 | 3.0 | 5.0 | 1800 | HIP | 2000 |
| 8* | 85 | 4.0 | 11.0 | 5.0 | 1850 | GPS | 10 |
| 9* | 90 | 9.5 | 0.5 | 2.0 | 1850 | GPS | 10 |
| 10* | 90 | 0.5 | 9.5 | 2.0 | 1850 | GPS | 10 |

| Sample No. (1) | Sintering Atmosphere | Flexural Strength (Kg/mm²) | | | Increase of Amount by Oxidation (mg/cm²) | Amount of Excessive Oxygen (% by weight) |
|---|---|---|---|---|---|---|
| | | room temperature | 200° C. | 1400° C. | | |
| 1 | $N_2$ | 83 | 83 | 81 | 0.09 | 1.0 |
| 2 | $N_2$ | 89 | 87 | 87 | 0.12 | 1.4 |
| 3 | $N_2$ | 73 | 72 | 70 | 0.18 | 1.5 |
| 4* | $N_2$ | 83 | 83 | 18 | 0.89 | −0.1 |
| 5* | $N_2$ | 45 | 43 | 41 | 0.10 | 4.0 |
| 6* | $N_2$ | 72 | 71 | 13 | 14.5 | −1.0 |
| 7 | $N_2$ | 92 | 91 | 91 | 0.07 | 1.3 |
| 8* | $N_2$ | 87 | 88 | 42 | 0.96 | 1.5 |
| 9* | $N_2$ | 37 | 36 | 32 | 0.85 | 1.1 |
| 10* | $N_2$ | 96 | 97 | 41 | 0.37 | 1.1 |

(1) The asterisked sample is a comparative sample.
(2) The amount (parts by weight) of $SiO_2$ is per 100 parts by weight of the sum of $Si_3N_4$, $ZrO_2$ and $Y_2O_3$.
(3) GPS indicates the gas pressure sintering method, PL indicates the pressureless sintering method and HIP indicates the hot isostatic pressure method.

As is apparent from Table 1, in conventional sample No. 6 where $SiO_2$ was not added or sample No. 4 where the amount added of $SiO_2$ was smaller than 1 part by weight, the amount of excessive oxygen was a negative value, and formation of ZrN was observed, the flexural strength at high temperatures was low and the increase of the amount by oxidation was very large. In contrast, in samples No. 1, No. 3 and No. 7 of the present invention, the amount of excessive oxygen was appropriate, and the flexural strength at room temperature, 200° C. and 1400° C. was higher than 70 kg/mm². Furthermore, the increase of the amount by oxidation was smaller than 0.2 mg/cm² and the oxidation resistance was excellent. However, in sample No. 5 in which the amount of $SiO_2$ was larger than 10 parts by weight, the increase of the amount by oxidation exceeded 3% by weight and the flexural strength was low at each temperature. In sample No. 8 where the amount of $Y_2O_3$ was larger than 10% by weight and sample No. 10 where the amount of $ZrO_2$ was smaller than 1% by weight, the high-temperature strength at 1400° C. was insufficient. Furthermore, if the amount of $Y_2O_3$ was smaller than 1% by weight, the flexural strength was reduced.

EXAMPLE 2

A powder of the same starting materials as used in Example 1, which had a composition shown in Table 2, was molded and sintered at a sintering temperature shown in Table 2 under a pressure of 300 kg/cm² in $N_2$ having a pressure of one atmosphere according to the hot press sintering method. The obtained sintered body was tested in the same manner as described in Example 1. The obtained results are shown in Table 2.

TABLE 2

| Sample No. | Composition (%) by weight | | | Amount of SiO2 (parts) by weight (1) | Sintering Temperature (°C.) | Flexural Strength (Kg/mm²) | | | Increase of Amount by Oxidation (mg/cm²) | Amount of Excessive Oxygen (% by weight) |
|---|---|---|---|---|---|---|---|---|---|---|
| | Si3N4 | ZrO2 | Y2O3 | | | room temperature | 200° C. | 1400° C. | | |
| 1 | 90 | 7.67 | 2.33 | 5.0 | 1700 | 83 | 83 | 83 | 0.08 | 1.0 |
| 2 | 90 | 7.0 | 3.0 | 7.0 | 1660 | 89 | 88 | 86 | 0.09 | 1.4 |
| 3 | 85 | 10.5 | 4.5 | 6.0 | 1720 | 94 | 94 | 92 | 0.13 | 1.0 |
| 4 | 90 | 7.0 | 3.0 | 10.0 | 1680 | 82 | 82 | 81 | 0.11 | 1.5 |

Note
(1) The amount (parts by weight) of SiO2 is per 100 parts by weight of the sum of Si3N4, ZrO2O3.

EXAMPLE 3

A powder of the same starting materials as described in Example 1, which had a composition shown in Table 3, was molded and sintered under conditions shown in Table 3. An equimolar mixture of metallic Si and SiO2 was placed in the sintering atmosphere in an amount of 80 g per 100 g of the starting powder.

The obtained sintered body was tested in the same manner as described in Example 1. The obtained results are shown in Table 3.

of the present invention were excellent in the creep resistance. Furthermore, they were excellent in the oxidation resistance, and the increase of the amount by oxidation was smaller than 0.1 mg/cm².

However, in the case where the amount of $Y_2O_3$ was larger than 10% by weight (sample No. 6), the creep resistance was reduced and also the oxidation resistance was degraded.

EXAMPLE 4

An aqueous solution containing zirconium chloride

TABLE 3

| Sample No. (1) | Composition (% by weight) | | | Sintering Temperature (°C.) | Sintering Method (2) | Pressure (atm) | Atmosphere |
|---|---|---|---|---|---|---|---|
| | Si3N4 | ZrO2 | Y2O3 | | | | |
| 1 | 90 | 7.67 | 2.33 | 1900 | GPS | 10 | N2 + Si/SiO |
| 2 | 90 | 7.67 | 2.33 | 1780 | PL | 1 | " |
| 3 | 90 | 7.67 | 2.33 | 1950 | HIP | 2000 | " |
| 4 | 90 | 7.67 | 2.33 | 1730 | HP | 300 Kg/cm² | " |
| 5 | 70 | 20 | 10 | 1900 | GPS | 10 | " |
| 6* | 70 | 18 | 12 | 1900 | GPS | 10 | " |
| 7* | 90 | 7.67 | 2.33 | 1900 | GPS | 10 | N2 |
| 8* | 90 | 7.67 | 2.33 | 1780 | PL | 1 | " |
| 9* | 90 | 7.67 | 2.33 | 1950 | HIP | 2000 | " |
| 10* | 90 | 7.67 | 2.33 | 1800 | HIP | 2000 | Ar |
| 11 | 90 | 7.99 | 2.01 | 1910 | GPS | 100 | N2 + Si/SiO2 |
| 12 | 90 | 7.99 | 2.01 | 1950 | HIP | 2000 | " |
| 13 | 90 | 7.99 | 2.01 | 1780 | PL | 1 | " |
| 14 | 90 | 7.99 | 2.01 | 1730 | HP | 300 Kg/cm² | " |

| Sample No. (1) | Flexural Strength (kg/mm²) | | Increase of Amount by Oxidation (mg/cm²) | Remarks |
|---|---|---|---|---|
| | room temperature | 1400° C. | | |
| 1 | 100 | 94 | 0.02 | |
| 2 | 79 | 78 | 0.03 | |
| 3 | 104 | 101 | 0.04 | |
| 4 | 89 | 89 | 0.02 | |
| 5 | 79 | 74 | 0.12 | |
| 6* | 74 | 56 | 0.50 | |
| 7* | 99 | 13 | 3.59 | oxidized even to interior |
| 8* | 84 | 5 | 4.44 | " |
| 9* | 109 | 14 | 6.01 | " |
| 10* | 101 | 11 | 5.92 | " |
| 11 | 94 | 91 | 0.04 | |
| 12 | 106 | 104 | 0.02 | |
| 13 | 78 | 73 | 0.06 | |
| 14 | 95 | 93 | 0.04 | |

Note
(1) The asterisked sample is a comparative sample.
(2) GPS indicates the gas pressure sintering method, PL indicates the pressureless sintering method, HIP indicates the hot hydrostatic pressure press method and HP indicates the hot press method.

As is apparent from the results shown in Table 3, if sintering of the Si3N4-ZrO2-Y2-O3 system was carried out in a nitrogen atmosphere or argon atmosphere (samples Nos. 7 through 10), reaction of ZrO2 with Si3N4 advanced to form ZrN and oxidation was extreme, and the flexural strength at 1400° C. was lower than 20 kg/cm².

In contrast, each of the samples of the present invention (Nos. 1 through 5 and 11 through 14) showed a high strength at a high temperature and reduction of the high-temperature strength from the flexural strength at room temperature was very small. That is, the samples and yttrium chloride at an oxide molar ratio shown in Table 4 was prepared. Sodium hydroxide was added to the aqueous solution to effect the hydrolysis and form a coprecipitate. The coprecipitate was washed with water and dried to obtain a starting coprecipitate shown in Table 4.

This starting coprecipitate was mixed with Si3N4 used in Example 1 at a composition shown in Table 4. The mixture was molded and sintered under conditions shown in Table 4. The obtained sintered body was tested in the same manner as described in Example 1. The obtained results are shown in Table 4.

TABLE 4

| Sample No. (1) | Composition (% by weight) | | | | Sintering Method | Sintering Temperature (°C.) |
|---|---|---|---|---|---|---|
| | $Si_3N_4$ | $ZrO_2(Y_2O_3)$ | $Y_2O_3/(ZrO_2 + Y_2O_3)$ | Other (3) | | |
| 1 | 90 | 10 | 0.15 | 2 $SiO_2$ | GPS | 1850 |
| 2 | 95 | 5 | 0.25 | 4 $SiO_2$ | HIP | 1800 |
| 3 | 85 | 15 | 0.08 | 5 $SiO_2$ | PL | 1750 |
| 4 | 90 | 10 | 0.15 | 1 $SiO_2$ | GPS | 1850 |
| 5 | 90 | 10 | 0.15 | 9.5 $SiO_2$ | GPS | 1850 |
| 6 | 90 | 10 | 0.15 | — | GPS | 1850 |
| 7 | 95 | 5 | 0.25 | — | GPS | 1850 |
| 8 | 85 | 15 | 0.08 | — | GPS | 1850 |
| 9 | 90 | 10 | 0.15 | 5 $SiO_2$ | HP | 1700 |
| 10* | 90 | 10 | 0.01 | — | GPS | 1850 |
| 11* | 90 | 10 | 0.35 | — | GPS | 1850 |
| 12* | 75 | 25 | 0.15 | — | GPS | 1850 |
| 13* | 90 | 10 | 0.15 | — | GPS | 1850 |
| 14* | 90 | 7.67 $ZrO_2$ 2.33 $Y_2O_3$ | 0.15 | 2 $SiO_2$ | GPS | 1850 |

| Sample No. (1) | Sintering Atmosphere | Pressure (atm) | Flexural Strength (kg/mm²) | | Increase of Amount by Oxidation (mg/cm²) |
|---|---|---|---|---|---|
| | | | room temperature | 1400° C. | |
| 1 | $N_2$ | 100 | 90 | 88 | 0.03 |
| 2 | $N_2$ | 2000 | 100 | 95 | 0.02 |
| 3 | $N_2$ | 1 | 85 | 82 | 0.04 |
| 4 | $N_2$ | 100 | 94 | 92 | 0.05 |
| 5 | $N_2$ | 10 | 96 | 91 | 0.05 |
| 6 | $N_2 + Si/SiO_2$ | 100 | 92 | 87 | 0.04 |
| 7 | $N_2 + Si/SiO_2$ | 10 | 99 | 97 | 0.07 |
| 8 | $N_2 + Si/SiO_2$ | 10 | 87 | 81 | 0.09 |
| 9 | $N_2$ | 100 kg/cm² | 87 | 85 | 0.09 |
| 10* | $N_2 + Si/SiO_2$ | 100 | not densified | | — |
| 11* | $N_2 + Si/SiO_2$ | 10 | 81 | 41 | 0.70 |
| 12* | $N_2 + Si/SiO_2$ | 10 | 80 | 38 | 0.79 |
| 13* | $N_2$ | 10 | Zr formed | | — |
| 14* | $N_2$ | 10 | 83 | 81 | 0.12 |

Note
(1) The asterisked sample is a comparative sample outside the scope of the present invention.
(2) The ratio is a molar ratio.
(3) The amount (parts by weight) is per 100 parts by weight of the sum of $Si_3N_4$ and $ZrO_2$ ($Y_2O_3$).
(4) GPS indicates the gas pressure press sintering method, HIP indicates the hot isostatic pressure press method, PL indicates the pressureless sintering method and HP indicates the hot press method.

As is apparent from Table 4, if the $Y_2O_3/(ZrO_2+Y_2O_3)$ molar ratio in the starting $ZrO_2$ ($Y_2O_3$) coprecipitate was lower than 0.02 (sample No. 9), sintering became difficult and densification was not caused. If the $Y_2O_3/(ZrO_2+Y_2O_3)$ molar ratio exceeded 0.30 (sample 10), the strength at a high temperature (1400° C.) was reduced and the oxidation resistance was degraded. If the amount of the starting $ZrO_2$ ($Y_2O_3$) coprecipitate exceeded 20% by weight (sample No. 11), the high-temperature strength and oxidation resistance were degraded as in case of sample No. 10.

Furthermore, if sintering was carried out in nitrogen gas not containing SiO (sample No. 12), ZrN was formed.

In contrast, in each of the samples of the present invention (samples Nos. 1 through 8), the flexural strength was higher than 80 kg/mm² at either room temperature or 1400° C., and the increase of the amount by oxidation was smaller than 0.1 mg/cm² and the oxidation resistance was excellent.

In the case where the coprecipitate was not used but $ZrO_2$ and $Y_2O_3$ were independently added (sample No. 14), the flexural strength and oxidation resistance were lower than those of the samples of the present invention.

EXAMPLE 5

A powdery mixture having a composition shown in Table 5 was molded and sintered under conditions shown in Table 5. The obtained sintered body was tested in the same manner as described in Example 1. The obtained results are shown in Table 5.

TABLE 5

| Sample No. (1) | Composition (% by weight) | | | Sintering Method (2) | Sintering Temperature (°C.) | $N_2$ Pressure (atm) |
|---|---|---|---|---|---|---|
| | $Si_3N_4$ | ZrC | $Y_2O_3$ | | | |
| 1 | 90 | 2 | 8 | GPS | 1900 | 10 |
| 2 | 85 | 5 | 10 | GPS | 1900 | 10 |
| 3 | 80 | 10 | 10 | GPS | 1900 | 10 |
| 4* | 70 | 15 | 15 | GPS | 1900 | 10 |
| 5* | 85 | 1 | 14 | GPS | 1900 | 10 |
| 6* | 85 | 14 | 1 | GPS | 1900 | 10 |
| 7 | 90 | 2 | 8 | HIP | 1800 | 2000 |
| 8 | 85 | 5 | 10 | HIP | 1800 | 2000 |
| 9 | 90 | 2 | 8 | HP | 1780 | 300 Kgf |
| 10 | 85 | 5 | 10 | HP | 1780 | 300 Kgf |
| 11 | 80 | 10 | 10 | PL | 1780 | 1 |
| 12 | 85 | 5 | 10 | PL | 1780 | 1 |
| 13 | 90 | 2 | 8 | GPS | 1900 | 100 |
| 14 | 90 | 2 | 8 | GPS | 1900 | 200 |
| 15* | 90 | 5 $ZrO_2$ | 5 | GPS | 1900 | 10 |

TABLE 5-continued

| | | | | | | | |
|---|---|---|---|---|---|---|---|
| 16 | 90 | 2 | 8 | GPS | 1900 | 10 | |
| 17 | 90 | 2 | 8 | GPS | 1850 | 10 | |
| 18* | 90 | 2 | 8 | GPS | 1850 | 10 | |
| 19 | 90 | 2 | 8 | PL | 1780 | 1 | |
| 20 | 90 | 2 | 8 | HP | 1780 | 300 | Kgf |
| 21 | 90 | 4 | 6 | HIP | 1800 | 2000 | |

| Sample No. (1) | Flexural Strength (kg/mm²) room temperature | 1400° C. | Increase of Amount by Oxidation (mg/cm²) | Remarks |
|---|---|---|---|---|
| 1 | 94 | 68 | 0.07 | |
| 2 | 86 | 62 | 0.12 | |
| 3 | 78 | 60 | 0.15 | |
| 4* | 61 | 32 | 1.94 | |
| 5* | 78 | 28 | 1.54 | |
| 6* | 38 | 20 | 2.96 | |
| 7 | 105 | 72 | 0.08 | |
| 8 | 98 | 63 | 0.09 | |
| 9 | 100 | 64 | 0.08 | |
| 10 | 99 | 60 | 0.13 | |
| 11 | 74 | 58 | 0.16 | |
| 12 | 78 | 59 | 0.17 | |
| 13 | 96 | 69 | 0.08 | |
| 14 | 94 | 72 | 0.07 | |
| 15* | 85 | 11 | 10.94 | |
| 16 | 96 | 72 | 0.06 | 2 parts by weight of $SiO_2$ was added |
| 17 | 88 | 70 | 0.05 | 8 parts by weight of $SiO_2$ was added |
| 18* | 48 | 32 | 0.07 | 15 parts by weight of $SiO_2$ was added |
| 19 | 79 | 69 | 0.11 | 5 parts by weight of $SiO_2$ was added |
| 20 | 105 | 69 | 0.10 | " |
| 21 | 115 | 71 | 0.05 | 4 parts by weight of $SiO_2$ was added |

Note
(1) The asterisked sample is a comparative sample outside the scope of the present invention.
(2) GPS indicates the gas pressure sintering method, PL indicates the pressureless sintering method, HIP indicates the hot isostatic pressure sintering method and HP indicates the hot press method.

As is apparent from the results shown in Table 5, in the case where $ZrO_2$ and $Y_2O_3$ were added as in the conventional technique (sample No. 15), the flexural strength at room temperature was high but the flexural strength was drastically reduced at 1400° C. and the increase of the amount by oxidation was large. In each of the samples of the present invention where ZrC was used (samples Nos. 1 through 3 and 7 through 14), irrespectively of the sintering method, the flexural strength was higher than 70 kg/mm² at room temperature and higher than 50 kg/mm² at 1400° C. and the increase of the amount by oxidation was smaller than 0.2 mg/cm². Thus, if was confirmed that the samples of the present invention were excellent in the high-temperature resistance and oxidation resistance.

If the sum of the amounts of ZrC and $Y_2O_3$ exceeded 20% by weight (sample No. 4), the strength was drastically reduced, and if the amount of $Y_2O_3$ was too large (sample No. 5), the high-temperature strength was reduced. If the amount of ZrC was too large (sample No. 6), the strength was reduced at either room temperature or 1400° C. In the case where $SiO_2$ was externally added (samples Nos. 16, 17, 19 and 20), the high-temperature strength and oxidation resistance were excellent, but if the amount of $SiO_2$ exceeded 10 parts by weight (sample No. 18), the strength was drastically reduced.

I claim:

1. A process for the preparation of a silicon nitride sintered body, which comprises: providing a starting material mixture consisting essentially of 5 to 10% by weight of zirconia and 1 to 10% by weight of yttria, with the balance being silicon nitride, each percent being based on the three components, and further containing silica in an amount of 1 to 10 parts by weight per 100 parts by weight of the sum of said three components; molding said starting material mixture to form a molded body; and sintering the molded body in a nitrogen atmosphere, wherein said sintering is carried out subsequent to or simultaneously with said molding.

2. A process according to claim 1, wherein sintering is carried out at a temperature of 1700° to 2000° C.

3. A process according to claim 1, wherein the molded mixture is sintered under a pressure of 0 to 2000 atmospheres (gauge).

4. A process according to claim 1, wherein the mixture is sintered under a pressure of 100 to 500 kg/cm² by a hot press.

5. A process according to claim 1, wherein zirconia and yttria in the starting material mixture are in the form of a mixed oxide obtained by coprecipitation, and having a molar composition represented by the following formula:

$$0.02 \leq Y_2O_3/(ZrO_2+Y_2O_3) \leq 0.30.$$

6. A process for the preparation of a silicon nitride sintered body, which comprises: molding a starting material mixture comprising 1 to 20% by weight of zirconia and 1 to 10% by weight of yttria, with the balance being silicon nitride, each percent being based on the three components; and sintering the molded body in a nitrogen atmosphere controlled by a co-present mixture of metallic silicon and silica, wherein said sintering is carried out subsequent to or simultaneously with said molding.

7. A process according to claim 6, wherein sintering is carried out at a temperature of 1700° to 2000° C.

8. A process according to claim 6, wherein the molar ratio ($Si/SiO_2$) of co-present metallic silicon and silica is in the range of from 0.1 to 10.

9. A process according to claim 6, wherein the mixture of metallic silicon and silica is co-present in an amount of 10 to 200% by weight based on the starting material mixture.

10. A process according to claim 6, wherein zirconia and yttria in the starting material mixture are in the form of a mixed oxide obtained by coprecipitation, and having molar composition represented by the following formula:

$$0.02 \leq Y_2O_3/(ZrO_2+Y_2O_3) \leq 0.30.$$

11. A process for the preparation of a silicon nitride sintered body, which comprises providing a starting material mixture comprising 1 to 10% by weight of zirconium carbide and 1 to 10% by weight of yttria, with the balance being silicon nitride, each percent being based on the three components; molding said starting material mixture to form a molded body; and sintering the molded body in a nitrogen atmosphere, wherein said sintering is carried out subsequent to or simultaneously with said molding.

12. A process according to claim 11, wherein silica is incorporated into the starting material mixture in an amount of up to 10 parts by weight per 100 parts by weight of the starting material mixture and sintering is carried out in the nitrogen atmosphere controlled by the incorporation of silica.

13. A process according to claim 11, wherein a mixture of metallic silicon and silica is made co-present in the sintering nitrogen atmosphere and sintering is carried out in the nitrogen atmosphere controlled by the co-presence of said mixture.

14. A process according to claim 5, wherein the $Y_2O_3/(ZrO_2+Y_2O_3)$ ratio is between 0.10 and 0.20.

15. A process according to claim 10, wherein the $Y_2O_3/(ZrO_2+Y_2O_3)$ ratio is between 0.10 and 0.20.

* * * * *